(12) United States Patent
Behnke

(10) Patent No.: US 6,587,772 B2
(45) Date of Patent: Jul. 1, 2003

(54) DEVICE FOR OPTIMIZING THE TRANSFER OF HARVESTED CROP FROM A HARVESTING MACHINE TO A TRANSPORT VEHICLE

(75) Inventor: Willi Behnke, Steinhagen (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/036,649

(22) Filed: Dec. 21, 2001

(65) Prior Publication Data

US 2002/0082757 A1 Jun. 27, 2002

(30) Foreign Application Priority Data

Dec. 23, 2000 (DE) .......................... 100 64 860

(51) Int. Cl.[7] ................................................. G06G 7/76
(52) U.S. Cl. .................. 701/50; 460/1; 460/8
(58) Field of Search ...................... 701/49, 50; 56/16.6; 172/4.5, 9; 141/231; 460/1, 8

(56) References Cited

U.S. PATENT DOCUMENTS

| | | | | |
|---|---|---|---|---|
| 4,091,602 A | * | 5/1978 | Williams et al. | 56/14.4 |
| 4,322,933 A | * | 4/1982 | Seymour | 460/2 |
| 4,376,609 A | * | 3/1983 | Bohman et al. | 414/335 |
| 5,457,948 A | * | 10/1995 | Willeby | 56/16.6 |
| 5,678,397 A | * | 10/1997 | Shelbourne et al. | 56/16.6 |
| 6,247,510 B1 | * | 6/2001 | Diekhans et al. | 141/231 |
| 2002/0083695 A1 | * | 7/2002 | Behnke et al. | 56/119 |

FOREIGN PATENT DOCUMENTS

| | | |
|---|---|---|
| DE | 44 26 059 | 2/1996 |
| DE | 196 45 723 | 5/1997 |
| DE | 196 14 028 | 10/1997 |
| DE | 196 47 522 | 5/1998 |
| DE | 196 47 523 | 5/1998 |
| DE | 197 05 842 | 8/1998 |
| DE | 199 21 995 | 11/2000 |

* cited by examiner

Primary Examiner—Gertrude Arthur
(74) Attorney, Agent, or Firm—Husch & Eppenberger, LLC; Robert E. Muir; David A. Chambers

(57) ABSTRACT

A device for optimizing the transfer of harvested crop from a harvesting machine to a transport vehicle includes a control unit in the harvesting machine that generates control signals and an control device in the transport vehicle that communicates with the control unit and adjusts the travel speed and the steering angle of the transport vehicle as a function of the control signals received from the control unit. A related method for optimizing the transfer of harvested crop from a harvesting machine to a transport vehicle is also provided that includes the steps of monitoring the status of a vehicle with a monitoring device and controlling the travel of the vehicle by means of at least one control device based on the status of the vehicle.

22 Claims, 3 Drawing Sheets

DEVICE FOR OPTIMIZING THE TRANSFER OF HARVESTED CROP FROM A HARVESTING MACHINE TO A TRANSPORT VEHICLE

TECHNICAL FIELD OF THE INVENTION

The present invention relates generally to agricultural machinery and, more particularly, to a device for optimizing the transfer of crop from a harvesting machine to a transport vehicle.

BACKGROUND OF THE INVENTION

Harvesting machines, such as combine harvesters and forage harvesters, pick up crop continuously during the harvesting process, treat it in a known manner and discharge the crop either continuously (e.g. with the forage harvester) or after intermediate storage (e.g. with the combine harvester) to a loading receptacle. The harvesting machines have a transfer device for this purpose. In a combine harvester, the transfer device is formed by a grain tank unloading tube. In a forage harvester, the transfer device is formed by an upper discharge chute. The loading receptacle can be located directly on the transport vehicle or on a trailer hitched to the transport vehicle.

In a forage harvester, which requires constant discharge of the harvested crop, the transport vehicle travels next to or behind the harvesting machine. It is extremely difficult to transfer the harvested crop from the harvester to the transport vehicle while both vehicles are moving. This problem is also present when the transfer of harvested crops from a combine harvester to a transport vehicle occurs while both vehicles are moving, which is a common practice used to maximize the amount of time the combine is actually harvesting crops.

Devices designed to optimize the transfer of harvested crops from a harvester to a transport vehicle are known in the art. These devices generally utilize optical or acoustic sensors to determine the relative position of the harvesting machine to the transport vehicle or the orientation of the transfer device to the loading receptacle. The transfer device is then adjusted either manually or automatically based on this relative positioning and orientation. Mechanisms for adjusting the transfer device are known in the art.

One example of an optimization device is disclosed in German patent DE 44 26 059 A1. This design uses a camera directed at both the discharge flap of the transfer device and the loading receptacle. This image is displayed to the driver of the forage harvester on a monitor for control of the transfer device. These devices ineffective if the driver of the transport vehicle is untrained or inattentive and drives the loading receptacle into a region which is outside what can be corrected with an adjustment of the transfer device.

The present invention is directed to overcoming one or more of the problems set forth above.

SUMMARY OF THE INVENTION

An aspect of the present invention is to provide a device for optimizing the transfer of harvested crop from a harvester to a transport vehicle that functions independently of the driver of the transport vehicle.

Another aspect of the present invention is to minimize the possibility of the harvester and transport vehicle crashing into one another, particularly when the transport vehicle is travelling behind the harvesting machine.

In accordance with the above aspect of the invention, there is provided a harvesting machine with at least one control unit for generating signals to control the speed of travel and the steering angle of a transport vehicle. These control signals are transmitted to an adjusting unit on the transport vehicle. The adjusting device automatically adjusts the travel speed (forward travel regulator) and steering angle (autopilot) of the transport vehicle as a function of the control signals supplied by the control unit in the harvesting machine. If the harvester brakes abruptly, for example, due to a suddenly appearing obstacle, a corresponding brake or stop signal can be generated by means of the control unit and sent to the transport vehicle. The time needed for this is only a fraction of the reaction time of the driver of the transport vehicle. In one embodiment, the control unit is operated manually by the driver of the harvesting machine. In an alternate embodiment, the control unit is operated automatically by means of sensors that determine the relative positions of the harvester and transport vehicle.

In another embodiment, a monitoring device on one of the vehicles determines the state of the vehicle and assigns a vehicle status to that state. This vehicle status is transmitted via a visual indicator to operators in other vehicles. In another embodiment, the vehicle status is transmitted electronically to other vehicles. In yet another embodiment, a control device is used to change the vehicle status assigned to the vehicle. This change in vehicle status is used to automatically affect the vehicle's travel speed, steering angle and other performance variables.

These aspects are merely illustrative aspects of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
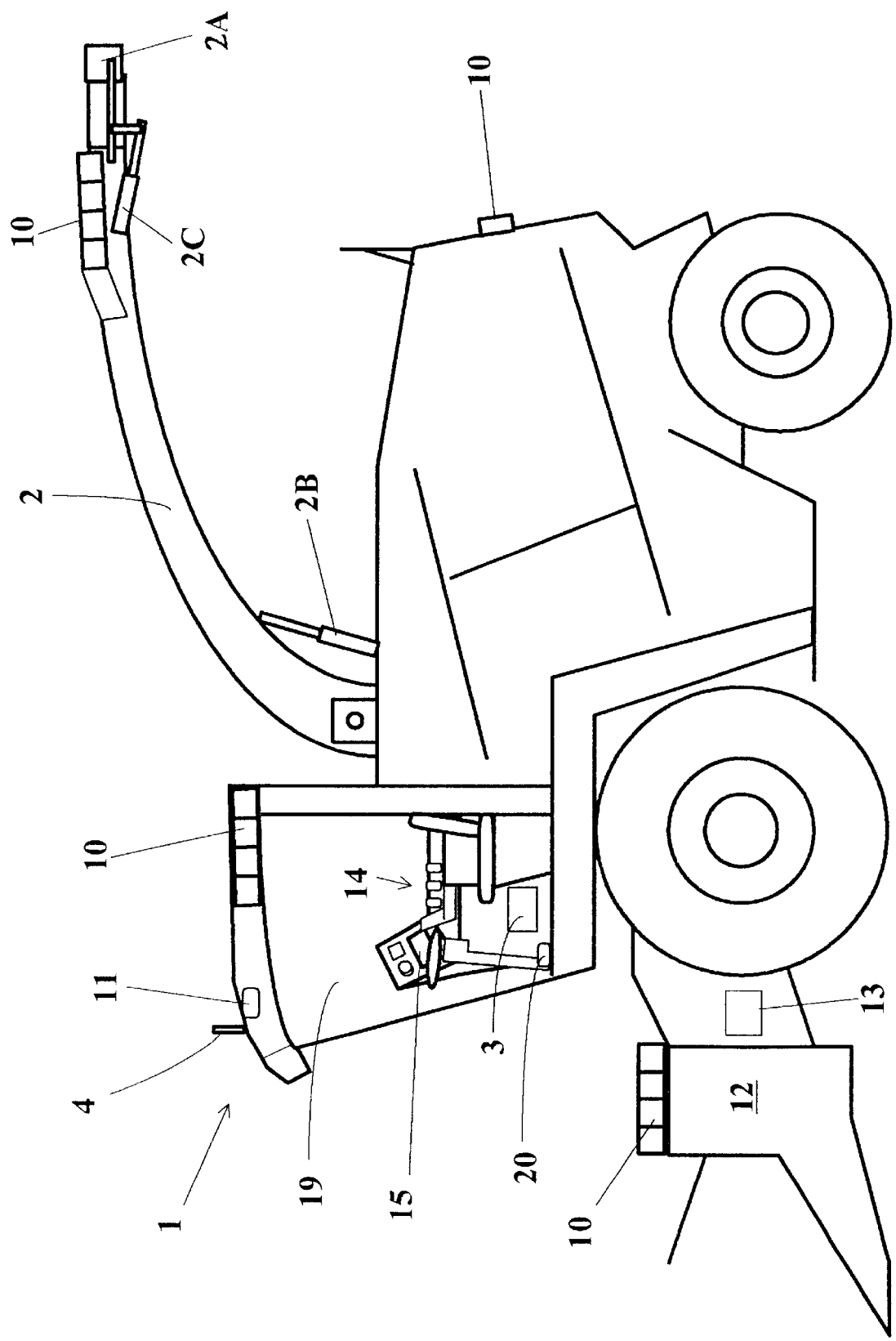
FIG. 1 is a schematic side view of a harvesting machine incorporating one embodiment of a device for optimizing the transfer of harvested crops according to the present invention.

FIG. 1 shows a harvesting machine 1 that includes a driver's cab 19, a crop pick-up device 12, and a transfer device comprised of an upper discharge chute 2 with a discharge flap 2A. The upper discharge chute 2 contains an adjusting member 2B for vertical pivoting of the chute and an adjusting member 2C for adjustment of the discharge flap 2A. The driver's cab 19 contains a control unit 3 that communicates with a control panel 14, a display 15, a display element 10, and a switching element 20. The control unit can be further connected by any suitable means, such as a bus link, to other devices capable of monitoring set parameters of the harvesting machine 1, operating instructions of the driver, and other events occurring in the harvesting machine 1. For example, in one embodiment, the control unit communicates with a metal detector 13 provided in the feed mechanism of the harvesting machine 1.

The display element 10 optically transmits driving instructions to a driver of a transport vehicle 5 (not shown in FIG. 1). The display element is manually controlled by the switching element 20. FIG. 1 shows display elements 10 placed at a variety of locations on the harvesting machine 1. In the embodiment shown in FIG. 1, four indicators are included in each display element 10. In one embodiment, each indicator represents one possible instruction to a driver of a transport vehicle. In another embodiment, each indicator represents a different status of the harvesting machine 1. Other vehicles, such as the transport vehicles, may also carry display elements 10 to indicate their current vehicle status.

A transmitting device 11 and associated aerial 4 enable the control unit 3 to transmit control signals to the transport vehicle 5 (not shown in FIG. 1). These control signals include instructions for the travel speed, steering angle, and other control variables of the transport vehicle 5. In another embodiment, the transmitting device 11 is a transmitting and receiving device that allows bidirectional wireless transmission of signals and information between the harvesting machine 1 and the transport vehicle 5. The control unit 3 communicates in this manner with a control device 24 (shown in FIG. 3 and also referred to as an adjusting device herein) located in the transport vehicle 5. As will be discussed in more detail below, the control device 24 processes the control signals from the control unit 3 to control the travel speed and steering angle of the transport vehicle 5.

In one embodiment, the control unit 3 is provided with a manual control for generation of the control signals for the travel speed and steering angle. This manual control may advantageously be in the form of a joystick, steering wheel, pedals or other suitable control device. The driver of the harvesting machine 1, who sits in a raised position relative to the driver of the transport vehicle 5, is thus able to control the transport vehicle 5 for optimum transfer. In an alternate embodiment, the control unit 3 generates the control signals based on the relative position of the harvesting machine 1 and transport vehicle 5, as determined by sensors communicating with the control unit 3.

In yet another embodiment, the control unit 3 utilizes the current travel speed and steering angle of the harvesting machine 1 at any given time to generate the control signals. In this case, the control device 24 automatically changes the travel speed and steering angle of the transport vehicle 5 to match that of the harvesting machine 1, without having to first transmit the actual speed and steering values of the transport vehicle 5 to the control unit 3. In an alternate embodiment, the control device 24 transmits the current speed and steering angle of the transport vehicle 5 to the control unit 3. The control unit 3 then generates correction values based on the transport vehicle's current speed and steering angle, which are transmitted back to the control device 24. The control device 24 then adjusts the speed and steering angle of the transport vehicle 5 based on the correction values.

In another embodiment, the harvesting machine 1 is provided with a forward travel regulator to control its travel speed and an autopilot to control the steering angle. In this embodiment, the control unit 3 communicates with the forward travel regulator and autopilot, and generates the control signals as a function of the current status of the forward travel regulator and autopilot.

Figure 2:
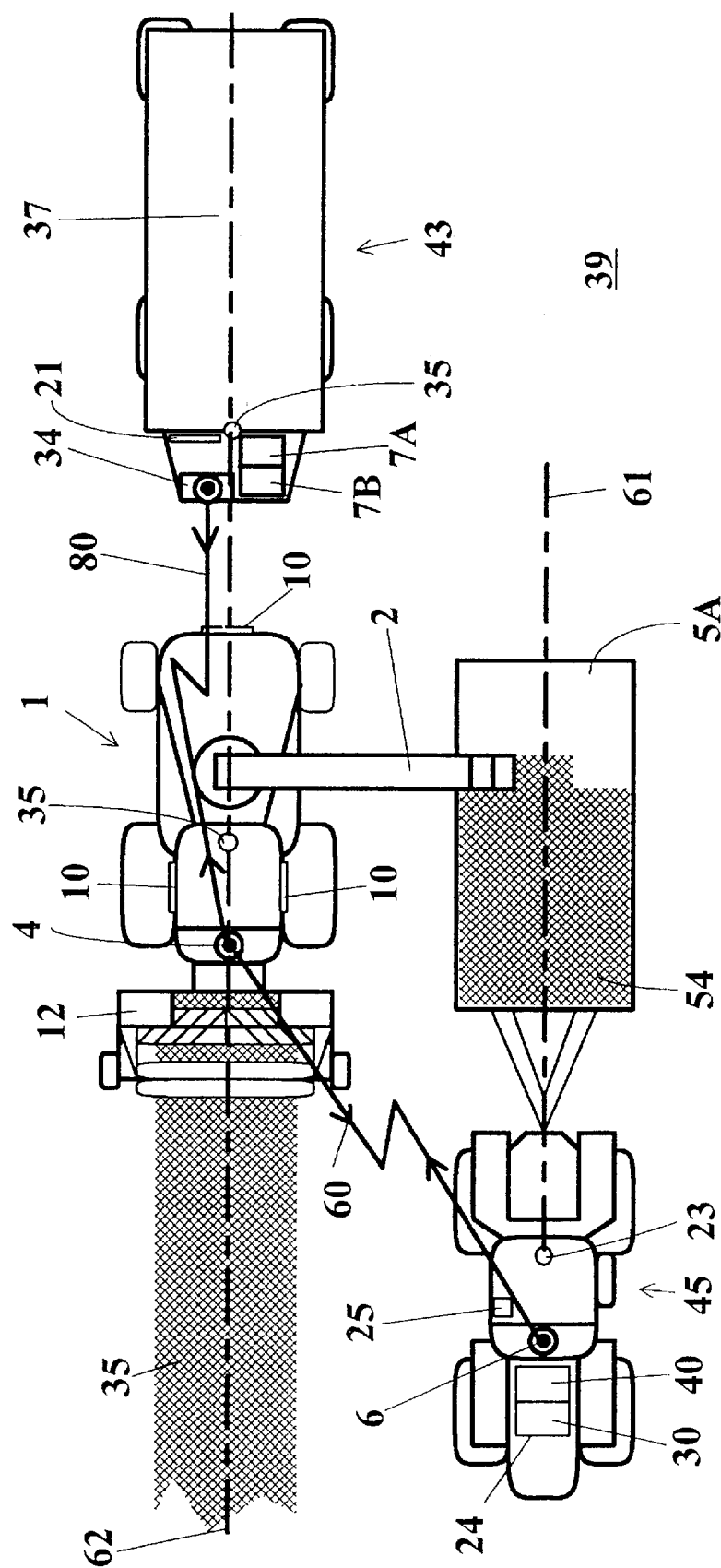
FIG. 2 is a schematic plan view of a harvesting machine and two transport vehicles incorporating another embodiment of a device for optimizing the transfer of harvested crops according to the present invention.

FIG. 2 shows a plan view of the harvesting machine 1 and two transport vehicles 5, 43 operating in a cultivated field 39. The first transport vehicle 5 is composed of a traction vehicle 45 and a loading receptacle 5A hitched to it. Harvested crops 35, 54 are transferred to the loading receptacle 5A by means of an upper discharge chute 2. The transport vehicle 5 moves on a track 61 parallel to the track 62 of the harvesting machine 1. The track 62 of the harvesting machine 1 is preset by the position of the crop 35 in the field 39.

The transport vehicles 5, 43 are controlled from the harvesting machine 1 by the control signals generated by the control unit 3. The first transport vehicle 5 is shown in a transfer position in which the vehicle is positioned next to and travels parallel to the harvesting machine 1 and wherein the transfer of the harvested crops from the harvesting machine 1 to the transport vehicle 5 occurs. The second transport vehicle 43 is shown in a waiting position, trailing the harvesting machine 1. One transport vehicle 5 can be moved out of the transfer position while, simultaneously, the next transport vehicle 43 can be moved out of a waiting position and into the transfer position.

A navigation device 23, advantageously a global positioning system, determines the position of the transport vehicle 5 in the field 39. The transport vehicle's position is then transmitted via a transmission section 60 and an aerial 6 to the harvesting machine 1. This position is offset against the position of the harvesting machine 1, which is determined by means of a second navigation device 18, such as a global positioning system. A signal corresponding to the offset is generated to control the travel speed, steering angle, and other control variables for the transport vehicle 5. Signals are transmitted via the transmission section 60 to the corresponding control device 24 and utilized accordingly by the steering control 32 and the drive control 42.

The first transport vehicle 5 is provided with a selector switch 25 in the driver's cab which allows operation of the transport vehicle 5 to be switched between manual and automatic adjustment of the travel speed, steering angle, and other control variables. The second transport vehicle 43 is shown as an unmanned vehicle with a loading receptacle 37 on top, moving on the same track 62 as the harvesting machine 1 in a waiting position. The transport vehicle 43 is also equipped with a navigation device 35 and adjusting devices 7A, 7B to control the travel speed and steering angle of the vehicle. A communication device 34 and transmission section 80 receive signals for travel speed and steering angle instructions, as well as other information. The vehicle 43 is also provided with a display device 21, which informs the driver of the harvesting machine 1 of the current status of the transport vehicle 43.

Figure 3:
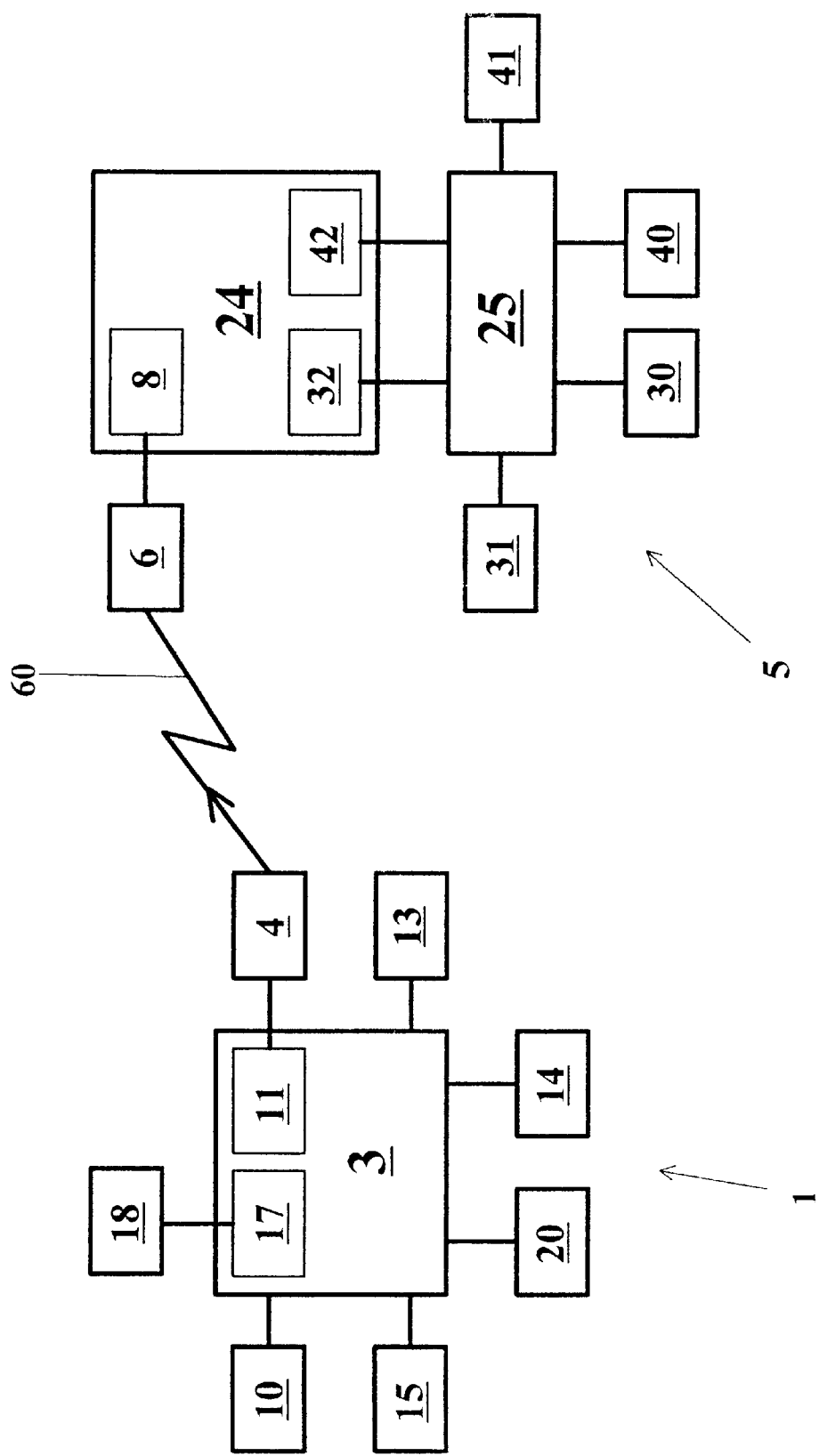
FIG. 3 is a block diagram of another embodiment of a device for optimizing the transfer of harvested crops according to the present invention.

FIG. 3 shows a block diagram of the control unit 3 of the harvesting machine 1 (not shown in FIG. 3) and a control device 24 located in the transport vehicle 5 (not shown in FIG. 3). The control unit 3 includes a navigation unit 17 with an associated GPS aerial 18 and a transmitting device 11 with an associated aerial 4. The control unit 3 communicates with the display 15, the control panel 14, the switching element 20, and at least one display device 10. The control unit 3 is also in communication with any peripheral devices, such as the metal detector 13. The control device 24 includes a receiving device 8 with an associated aerial 6. The control device 24 communicates with the selector switch 25, a drive control 32, a steering control 42.

In operation, the control device 24 receives control signals transmitted by the control unit 3. If the selector switch 25 is set for automatic adjustment, the control device 24 processes the control signal received from the control unit 3 and generates a set value for travel speed and steering angle based on the control signal. The control device 24 then transmits the travel speed set value to the drive control 32 and the steering angle set value to the steering control 42. The drive control 32 and the steering control 42 then use the respective set values to control a ground drive 30 and steering device 40 in the transport vehicle 5. If the selector switch is set for manual adjustment, the ground drive 30 and steering device 40 are controlled through the drive control 32 and steering control 42 by the operator of the transport vehicle 5. The selector switch 25 gives the operator of the transport vehicle 5 the option at any time of freely deciding whether he will manually control the transport vehicle 5 or let it be remotely controlled in an automated fashion by the control unit 3. In this manner, the driver of the transport vehicle 5 may drive it manually into a transfer position and then operate the selector switch 25 as desired, so that from that moment, the speed of travel, the steering angle or both are controlled from the harvesting machine 1. In an alternative embodiment, automatic control of the transport vehicle 5 can be overridden by manual operation of the steering wheel, the accelerator pedal or the foot brake.

In another embodiment of the present invention, the control unit 3 operates as a monitoring device in order to monitor the current state of the harvesting machine 1. The control unit 3 assigns a vehicle status to the current state of the harvesting machine 1. A vehicle status may include, for example, the following: picking up and harvesting crop during normal operation; or an immediate stop by an actuated safety device for avoiding vehicle damage, such as the response of the metal detector in the feeder mechanisms. The vehicle operator is informed of the current vehicle status by an indicator. The vehicle status assigned by the control unit 3 can be used by the control unit 3 itself and other devices in the harvesting machine 1. For example, when the status is an immediate stop, the control unit 3 generates a signal that is directly transmitted to the ground drive and the brakes of the harvesting machine 1 and thereby advantageously achieves automatic rapid stopping of the vehicle. In a similar embodiment, the control device 24 acts as a monitoring device and monitors the current state of the transport vehicle 5 and assigns a vehicle status to that state.

The display device 10 is used in this embodiment to indicate the vehicle status of the respective vehicle. This system visually communicates the vehicle status to other vehicles operating in the field, which is particularly advantageous in the dark. If all of the vehicles operating are equipped with a monitoring device and display device 10, each vehicle can indicate its respective status. For example, a green light may indicate a status of "waiting while stationary," a flashing light may indicate a status of "empty vehicle," or a red light or no light may indicate a status of "vehicle full." This status information can be further communicated advantageously by acoustic means. If there are unmanned transport vehicles being operated, further status forms and modes of indication may be necessary and used.

In another embodiment, the vehicle status is transmitted to at least one of the other vehicles in the field. This results in the operator or device of another vehicle receiving the status of the first vehicle regardless of the relative locations of the two vehicles. For instance, the vehicle status can be transmitted to a display device located in the second vehicle. In this manner, a change in vehicle status can be communicated directly to the driver of the second vehicle, which would allow the driver to modify the second vehicle's travel to correspond to the new vehicle status of the first vehicle. The vehicle status can also be transmitted directly to a control device 24 in the second vehicle, so that when the vehicle status changes, the control device 24 automatically takes the appropriate action. For example, if the vehicle status of the harvesting machine 1 changes from "harvesting" to "immediate-stop", the driver of the transport vehicle 5 can react by reducing the speed of the transport vehicle, or the control device 24 can automatically stop the transport vehicle 5 through the drive control 32.

In another embodiment, the vehicle status is provided with a priority. As a result, an important status can be distinguished from a less important status, thereby allowing the driver of the second vehicle or a control device on the vehicle to process and respond to the changes in vehicle status according to the importance of each change.

In another embodiment, the vehicle status is transmitted only upon the occurrence of a defined event or an external status inquiry. This results in an advantageous reduction in the load on the data transmission section of the monitoring device.

In yet another embodiment, the vehicle status of a vehicle is altered at the command of another device either on the vehicle itself or on another vehicle. For example, the driver of the harvesting machine 1 may notice that the loading receptacle is full. The driver can then change the status of the corresponding vehicle by remote control to, for example, a status of "vehicle full." This embodiment is particularly advantageous in controlling unmanned transport vehicles. The driver of the harvesting machine 1 can see the respective status of the transport vehicle on a display or request it by an inquiry by means of the transmission section. If a transport vehicle parked in the field or waiting now comes within the visual range of the driver of the harvesting vehicle, he can cause this vehicle to follow automatically by means of a status change.

The driver of the harvesting machine 1 can also change the status of a second vehicle to initiate a preprogrammed action, for example, adopting a waiting position while stationary, a waiting position at a relative distance while moving, a relative controlled position at a relative distance while moving and/or a waiting position while moving to the further vehicle. The other vehicles in the field can be controlled in a coordinated manner relative to the position of the harvesting machine 1, according to the harvesting machine's own position and the selected status. For example, the other vehicles may be positioned in a transfer position for transfer of crop to the corresponding loading receptacle, on a track parallel to the track of the harvesting machine 1; in a waiting position in which no crop is transferred; or on the track of the harvesting machine 1.

The other vehicles in the field can be coordinated from the control unit 3, acting as a coordination device in the harvesting machine 1, as a function of the respective status of the individual transport vehicle or the harvesting machine 1. If a transport vehicle in the field has a status of "empty vehicle" while the loading receptacle of the harvesting machine is still being filled, the transport vehicle can be automatically directed to a waiting position relative to the harvesting machine 1 and any vehicle that is being filled by the harvesting machine 1 at that time. When the transport vehicle currently being loaded is filled, the operator in the harvesting machine 1 can manipulate the transfer device to deliver the harvested crop into the waiting transport vehicle.

The filled vehicle is then directed to a waiting position. The control unit 3, acting as a coordination device, then changes the status of the empty vehicle from "empty vehicle" to "filling" and the status of the filled vehicle from "filling" to "vehicle full." Vehicles having a "vehicle full" status can be switched to "full stationary" status and released from control of the coordinating device 3 when the harvesting machine reaches the end of a cultivated field. At this point, the coordinating device 3 can gain control of any vehicles waiting at the end of the field having an "empty vehicle" status and control them in the manner described previously.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

I claim:

1. A device for optimizing the transfer of harvested crop from a harvesting machine to a transport vehicle, including a control unit in the harvesting machine that generates control signals and a control device in the transport vehicle that communicates with the control unit and adjusts the travel speed and the steering angle of the transport vehicle as a function of the control signals received from the control unit.

2. A device for optimizing the transfer of harvested crop from a harvesting machine to a transport vehicle according to claim 1, further including a selector switch with which control of the transport vehicle is switched between the control device and a vehicle operator.

3. A device for optimizing the transfer of harvested crop from a harvesting machine to a transport vehicle according to claim 1, further including a manual control device in communication with the control unit wherein the control unit generates the control signals as a function of a vehicle operator's manipulation of the manual control device.

4. A device for optimizing the transfer of harvested crop from a harvesting machine to a transport vehicle according to claim 1, further including a first vehicle position location device in the harvesting machine that communicates with the control unit and a second vehicle position location device in the transport vehicle that communicates with the control unit and wherein the control unit determines the relative position of the transport vehicle to the harvesting machine and generates the control signals as a function of the relative position of the transport vehicle to the harvesting machine.

5. A device for optimizing the transfer of harvested crop from a harvesting machine to a transport vehicle according to claim 4, wherein the first and second vehicle position location devices are global positioning system receivers.

6. A device for optimizing the transfer of harvested crop from a harvesting machine to a transport vehicle according to claim 4, wherein the first and second vehicle position location devices are phase-differential global positioning system receivers.

7. A device for optimizing the transfer of harvested crop from a harvesting machine to a transport vehicle according to claim 1, further including at least one sensor in the harvesting machine that communicates with the control unit and determines the relative position of the transport vehicle to the harvesting machine and wherein the control unit generates the control signals as a function of the relative position of the transport vehicle to the harvesting machine.

8. A device for optimizing the transfer of harvested crop from a harvesting machine to a transport vehicle according to claim 1, further including at least one machine status sensor that communicates with the control unit and determines the current travel speed and steering angle of the harvesting machine and wherein the control unit generates the control signals as a function of the current travel speed and steering angle of the harvesting machine.

9. A device for optimizing the transfer of harvested crop from a harvesting machine to a transport vehicle, including a monitoring device in a first vehicle that determines the state of the first vehicle and assigns a vehicle status to said state that is used in at least the first vehicle.

10. A device for optimizing the transfer of harvested crop from a harvesting machine to a transport vehicle according to claim 9, further including a vehicle status indicator in the first vehicle, said vehicle status indicator being visible from the exterior of the first vehicle.

11. A device for optimizing the transfer of harvested crop from a harvesting machine to a transport vehicle according to claim 9, wherein the vehicle status indicator is in the form of a multi-colored light array.

12. A device for optimizing the transfer of harvested crop from a harvesting machine to a transport vehicle according to claim 9, wherein the vehicle status of the first vehicle is transmitted to a second vehicle.

13. A device for optimizing the transfer of harvested crop from a harvesting machine to a transport vehicle according to claim 12, wherein the vehicle status transmitted to the second vehicle is assigned a priority.

14. A device for optimizing the transfer of harvested crop from a harvesting machine to a transport vehicle according to claim 12, wherein the vehicle status signal is transmitted upon the occurrence of a designated event.

15. A device for optimizing the transfer of harvested crop from a harvesting machine to a transport vehicle according to claim 12, wherein the vehicle status signal is transmitted upon an external vehicle status inquiry.

16. A device for optimizing the transfer of harvested crop from a harvesting machine to a transport vehicle according to claim 9, further including an additional device located in the first vehicle that changes the vehicle status.

17. A device for optimizing the transfer of harvested crop from a harvesting machine to a transport vehicle according to claim 9, further including an external device that changes the vehicle status.

18. A method for optimizing the transfer of harvested crop from a harvesting machine to a transport vehicle, including the steps of:

monitoring the status of a vehicle with a monitoring device;

controlling the travel of the vehicle by means of at least one control device based on the status of the vehicle.

19. A method for optimizing the transfer of harvested crop from a harvesting machine to a transport vehicle according to claim 18, wherein the step of controlling the travel of the vehicle is automatically triggered and the particular travel characteristics of the vehicle are automatically chosen based on the nature of the vehicle status.

20. A method for optimizing the transfer of harvested crop from a harvesting machine to a transport vehicle according to claim 18, wherein the step of controlling the travel of the vehicle involves choosing one of a set of predefined actions based on the nature of the vehicle status.

21. A method for optimizing the transfer of harvested crop from a harvesting machine to a transport vehicle according to claim 20, wherein the set of predefined actions includes a stationary waiting position, a moving waiting position, and a transfer position.

22. A device for optimizing the transfer of harvested crop from a harvesting machine to a transport vehicle, including:

a coordination device located in a first vehicle;

a monitoring device located in a second vehicle and in communication with the coordination device which monitors the status of the second vehicle and transmits that vehicle status to the coordination device; and a control device located in the second vehicle and in communication with the coordination device which controls the travel speed and steering angle of the second vehicle, whereby the coordination device communicates with the control device to affect the travel speed and steering angle of the second vehicle as a function of the vehicle status transmitted to the coordination device by the monitoring device.

* * * * *